US004001588B2

United States Statutory Invention Registration [19]

[11] Reg. Number: H1588

[45] Published: Sep. 3, 1996

Arney

[54] HELICAL SPRING FASTENER

[76] Inventor: David V. Arney, 3895 Midway Dr., Apt. #318, San Diego, Calif. 92110

[21] Appl. No.: 988,310

[22] Filed: Dec. 8, 1992

[51] Int. Cl.[6] ..... H01Q 1/12

[52] U.S. Cl. ..... 343/715; 343/878; 343/888; 343/900

[58] Field of Search ..... 343/715, 749, 343/878, 888, 895, 906, 900; 403/229, 223, 220; 439/916, 840, 841; 267/179, 170, 169; H01Q 1/12, 1/20, 1/32

[56] References Cited

U.S. PATENT DOCUMENTS

| | | | |
|---|---|---|---|
| 1,074,302 | 3/1913 | Daspe | 343/900 |
| 1,085,505 | 1/1914 | Stafford | 403/229 X |
| 2,283,607 | 5/1942 | Ludwig | 403/229 |
| 2,546,026 | 3/1951 | Coon | 403/229 X |
| 3,106,712 | 10/1963 | Daggett | 74/105 |
| 3,229,295 | 1/1966 | Watkin et al. | 343/709 |
| 3,279,133 | 10/1966 | Korte | 403/229 |
| 3,507,069 | 4/1970 | Borba | 403/229 |
| 3,624,662 | 11/1971 | Feder | 343/715 |
| 3,886,560 | 5/1975 | Mortensen et al. | 343/882 |
| 4,103,305 | 7/1978 | Gualano | 343/900 |
| 4,109,251 | 8/1978 | MacDougall | 343/715 |
| 4,205,319 | 5/1980 | Gasparaitis et al. | 343/792 |
| 4,380,847 | 4/1983 | Tajima | 403/229 X |
| 4,514,926 | 5/1985 | Weber, Sr. | 403/229 X |
| 4,760,348 | 7/1988 | Pease et al. | 343/709 |
| 4,766,441 | 8/1988 | Phillips et al. | 343/709 |
| 4,774,519 | 9/1988 | Pease et al. | 343/709 |
| 4,914,450 | 4/1990 | Dilley et al. | 343/900 |
| 5,049,896 | 9/1991 | Conley | 343/888 |
| 5,101,213 | 3/1992 | Harada et al. | 343/715 |
| 5,103,236 | 4/1992 | DuShane | 343/765 |

*Primary Examiner*—Bernarr E. Gregory

[57] ABSTRACT

The invention is a two-ended fastener having one end suitable for attaching the fastener to a base with a second end having a special thread that is substantially cylindrical at its root and sharp at its crown. This thread is designed to mate with the radially inward surfaces of a round wire helical spring so that the helical spring may simply be threaded to the fastener. By utilizing the special thread described, a high degree of surface contact between the fastener and the spring is made possible, increasing spring retention. The special thread inner diameter may be made slightly larger than the interior diameter of the spring so that the helical spring will be slightly expanded when threaded to the fastener. An elastic force between the threaded portion of the spring and the fastener further helps retain the spring to the fastener. This elastic force increases as an attempt is made to unthread the spring from the fastener.

3 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HELICAL SPRING FASTENER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention pertains broadly to the field of fasteners and in particular to fasteners designed to retain a helical spring.

2. Description of the Related Art

Prior methods of retaining a helical spring have included placing one end of the spring over a fixed cylinder and then retaining the spring on the cylinder by way of clamps, two-piece collars, screws, brazing/welding or one or more pins placed through coils of the spring and the accompanying cylinder. Another technique includes using a tapered cylinder or mandrel upon which an end of the spring is pressed with the compression of the spring on the mandrel retaining the spring in place.

Of course, the need to fasten helical springs is varied. In one military application, a need arises where it is desired to affix a spring-based antenna onto a vehicle or other surface. Many military vehicles such as Jeeps, HUMVEEs, tanks, river patrol boats and the like oftentimes incorporate such antennas for communication purposes. The need extends not only to surface vehicles but to submersibles such as manned submarines and underwater robotic vessels. In the latter application, such a fastener should be able to hold a helical spring both when vibrated and when subjected to air and water flow. It is also desirable that a spring fastener be easy to manufacture, easy to implement and low in cost.

SUMMARY OF THE INVENTION

The invention is a two-ended fastener having one end suitable for attaching to a base such as a vehicle or antenna with a second end having a special exterior thread that is substantially cylindrical at its root and sharp at its crown. This thread is designed to mate with the radially inward surfaces of a round wire helical spring so that the helical spring may simply be threaded onto the fastener. By utilizing the special thread described, a high degree of surface contact between the fastener and the spring exists. This thread design prevents the spring from easily disengaging from the fastener.

In a variation of the invention, the inner thread diameter of the special thread may be made slightly larger than the inner diameter of the spring so that the helical spring will be slightly expanded when threaded to the fastener. An elastic force will then exist between the threaded portion of the spring and the fastener enhancing the retention of the spring on the fastener. This elastic force increases when an attempt is made to unthread the spring from its threaded position further increasing the spring retention to the fastener.

OBJECTS OF THE INVENTION

It is an object of this invention to provide an improved means of retaining a helical spring.

Another object of the invention is to provide a fastener for retaining a round-wire helical spring that is easy to manufacture, easy to implement, that is simple in design and low in cost.

Yet another objective of the invention is to provide a method for retaining a spring-based antenna.

Other objects, advantages and new features of the invention will become apparent from the following detailed description of the invention when considered in conjunction with the accompanying drawings.

DESCRIPTION OF THE PREFERRED EMBODIMENT

Figure 1C:
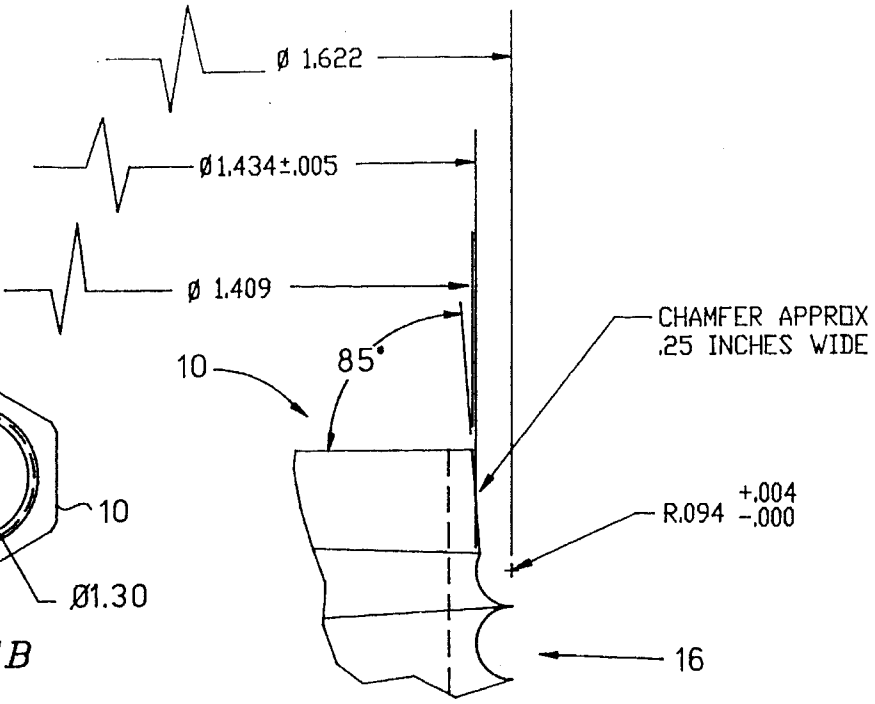
FIGS. 1A–1C are side, top and detailed views, respectively, of the fastener of the invention (dimensions shown in inches).
Figure 1B:
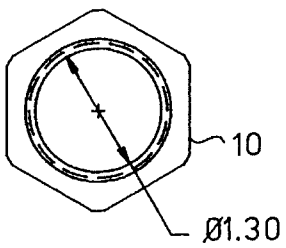
Figure 1A:
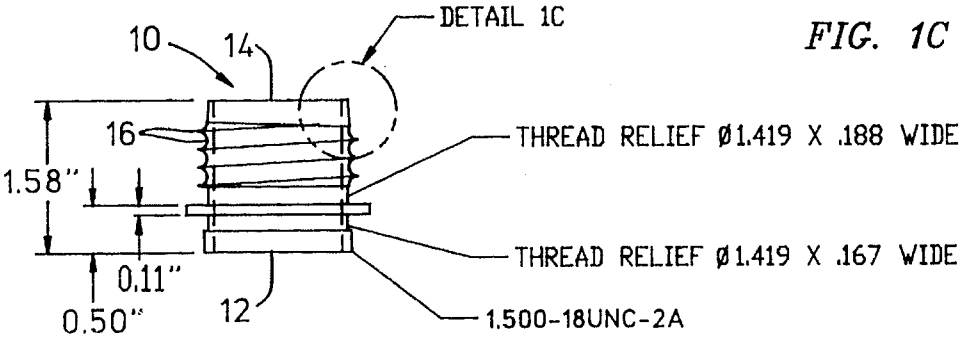

Referring to FIG. 1A, a side view of a representative example of the invention is shown This example is like one utilized with an underwater robot incorporating a spring-based antenna. For this application, the fastener of the invention was fabricated from Acetal Polyoxymethyline Acetal plastic. This plastic provided ample strength for the conditions expected and was impervious to saltwater corrosion. In FIG. 1A it can be seen that fastener 10 has a first end 12 that permits the fastener to be attached to a base such as a vehicle body or such as to a collar attached to an antenna whip. In the embodiment shown, end 12 was threaded with a 1.500-18UNC-2A thread. Fastener 10 also includes a second end 14 in which a special thread 16 has been made. In the actual implementation of the invention this thread was cut into the Acetal plastic utilizing a tool that mimics the radial inward surface of a matching round-wire helical spring.

Figure 2B:
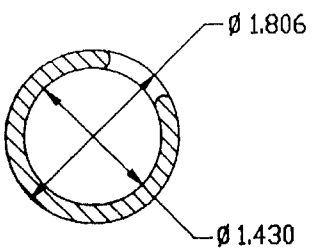
FIGS. 2A and 2B are respectively side and top views of a round-wire helical spring as may be utilized in the invention (dimensions in inches).
Figure 2A:
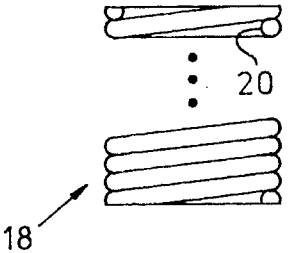

In FIGS. 2A and 2B such a round-wire helical spring, 18, is shown. Spring 18 has radially inward surfaces 20 that match special thread 16. In the specific implementation of the invention, spring 18 was made from spring steel of Cres-type 302 having a spring-wire diameter of 0.188 inches per AMS 5688 and a spring temper in accordance with QQ-W-423 in which the finish was passivated in accordance with QQ-P-35, type VI or VII. The spring had 26 coils, was righthanded, and had its ends ground. Initial tension was 7 pounds plus or minus 1 pound. Such a spring is available through Moore Spring Company of Spring Valley, California under part number 71591-188.

FIG. 1B is a top view of fastener 10 with FIG. 1C showing a detail of the special threading utilized in the invention. In FIG. 1C it can readily be seen that threading 16 is conical at its root and sharp at its crown. This threading permitted maximum interfacing with radially inward surfaces 20 of spring 18 so as to enhance the spring retention capability of fastener 10.

In the specific implementation of the invention used, the inside diameter of thread 16 was made approximately 0.003 of an inch larger than the inside diameter of spring 18. This was done so that as spring 18 was threaded onto fastener 10 a slight expansion of the spring occurred at the spring's threading interfaces. This, of course, caused an elastic force between fastener 10 and the threaded portion of spring 18, further enhancing the spring retention capability of the fastener.

This elastic force is of particular importance where rotational forces work upon spring 18, posing a possible disassembly of spring 18 from fastener 10. It has been found that a rotational force in the direction of unthreading spring 18 from fastener 10 actually increases the spring's grip upon the fastener. During the application of this force, the spring radially compresses to cause this effect. Applying a rotational force in the opposite direction simply further tightens the spring to the fastener.

Figure 3:
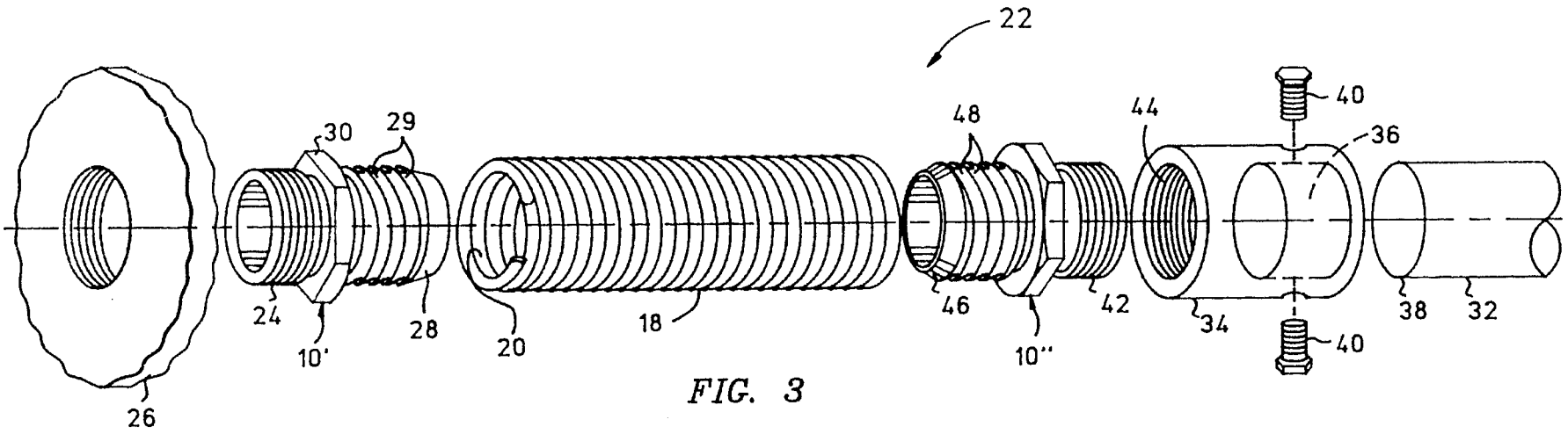
FIG. 3 is an exploded view of a utilization of the invention in a spring-based antenna scheme.

Referring now to FIG. 3 there is shown an exploded view of a spring-based antenna assembly 22. In such an assembly two fastener, shown as 10' and 10", are utilized with round-wire helical spring 18. First fastener 10' has a first end 24 that is suitably attached to a body 26 by threading, welding or other sufficient attachment mechanism (threading being shown). Round-wire helical spring 18 is then screwed onto second end 28 of first fastener 10'. The spring is screwed onto cylindrical thread 29 of the fastener until seated against its flange 30. As previously explained, the special threading of the fastener may be designed so that an expansion of spring 18 occurs at the spring's interface with the fastener's threads. The resulting compression of the spring upon fastener 10 enhances spring retainment.

In a similar fashion, second fastener 10" is used to attach an antenna whip to spring 18. In this scenario whip 32 is fitted into a collar 34 having a recess 36 suitably dimensioned to accept end 38 of the whip. Whip 32 is then fixed in place by any suitable means such as screw-in fasteners 40. Collar 34 is also designed to attach to second fastener 10". In the implementation shown, first end 42 of fastener 10" has threads that match with threads 44 suitably tapped within collar 34 Second fastener 10" has, like first fastener 10', a second end, 46, defining conical threads 48 suitable for matching the radially inward surfaces 20 of spring 18.

It can readily be seen that the fastener of the invention may be utilized in a wide variety of scenarios where it is desired that a helical spring be retained. The one-part nature of the fastener is considered superior to its multiple-part competitors. It is easy to manufacture, easy to use, simple in design and low in cost. This single-part design can be considered more reliable than many multiple-part retention systems as there are no screws, clamps, etc., to work loose. In addition, the fastener of the invention fits inside a utilized spring, resulting in a very small package, which is, at most, of only a slightly larger diameter than the outside diameter of the spring used.

A number of different utilizations of the invention are, of course, possible. The material used to produce the invention could be changed to other suitable materials such as stainless steel, aluminum, bronze as well as many plastics. Of course, the diameter, size and nature of the special threads used in the invention could be changed to accommodate many different springs.

Obviously, many modifications and variations of the invention are possible in light of the above teachings. It is therefore to be understood that within the scope of the appended claims the invention may be practiced otherwise than as has been specifically described.

What is claimed is:

1. A fastener for retaining a round wire helical spring comprising:

a first end for attaching said fastener to a base; and a substantially cylindrical second end for attaching said fastener to said helical spring, said second end having an exterior thread that is cylindrical at its root and sharp at its crown and that substantially conforms to radially inward surfaces of said helical spring, said exterior thread further having an inner diameter that is slightly larger than an inner diameter of said round wire helical spring so that said helical spring is slightly expanded where threaded to said fastener.

2. An flexible link comprising:

a round wire helical spring; and a fastener attached at both ends of said round wire helical spring, each of said fasteners having an exterior thread substantially cylindrical at its root and sharp at its crown that mates with radially inward surfaces of said round wire helical spring, with said exterior thread further having an inner diameter that is slightly larger than an inner diameter of said helical spring so that said helical spring is slightly expanded where threaded to said fasteners.

3. An antenna system comprising:

a round wire helical spring having a first and second end;

a fastener having a first end for attaching said fastener to a base and having a second end for attaching said fastener to said first end of said round wire helical antenna spring, said second end of said fastener having an exterior thread substantially cylindrical at its root and sharp at its crown that mates with radially inward surfaces of said round wire helical spring;

an antenna whip;

a collar having a recess into which an end of said antenna whip is fixed;

a second fastener having a first end for attaching to said collar and having a second end for attaching to said second end of said round wire helical antenna spring, said second end of said second fastener having an exterior thread substantially cylindrical at its root and sharp at its crown that mates with radially inward surfaces of said round wire helical spring, and in which said exterior thread of said fasteners have an inner diameter that is slightly larger than an inner diameter of said helical spring so that said helical spring is slightly expanded where threaded to said fasteners.

* * * * *